(12) United States Patent
Shannon et al.

(10) Patent No.: US 11,450,140 B2
(45) Date of Patent: *Sep. 20, 2022

(54) INDEPENDENTLY PROCESSING PLURALITY OF REGIONS OF INTEREST

(71) Applicant: 3M INNOVATIVE PROPERTIES COMPANY, St. Paul, MN (US)

(72) Inventors: Robert W. Shannon, Stillwater, MN (US); Douglas S. Dunn, Woodbury, MN (US); Glenn E. Casner, Woodbury, MN (US); Jonathan D. Gandrud, Woodbury, MN (US); Shannon D. Scott, Hudson, WI (US); Gautam Singh, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 56 days.

This patent is subject to a terminal disclaimer.

(21) Appl. No.: 17/301,816

(22) Filed: Apr. 15, 2021

(65) Prior Publication Data

US 2021/0232797 A1 Jul. 29, 2021

Related U.S. Application Data

(63) Continuation-in-part of application No. 16/323,561, filed as application No. PCT/US2017/046529 on Aug. 11, 2017, now Pat. No. 11,023,762.

(Continued)

(51) Int. Cl.
*G06V 40/13* (2022.01)
*G06V 40/12* (2022.01)
(Continued)

(52) U.S. Cl.
CPC ............ *G06V 40/1359* (2022.01); *G06T 3/40* (2013.01); *G06V 10/25* (2022.01); *G06V 40/1318* (2022.01)

(58) Field of Classification Search
CPC ............ G06K 9/3233; G06K 9/00033; G06K 9/00201; G06K 9/00067; G06T 7/593;
(Continued)

(56) References Cited

U.S. PATENT DOCUMENTS

| 2005/0111705 A1 | 5/2005 | Waupotitsch |
| 2012/0056998 A1* | 3/2012 | Kang .................. H04N 13/239 348/47 |

(Continued)

FOREIGN PATENT DOCUMENTS

| CN | 102521795 | 4/2014 |
| WO | WO 2006-016359 | 2/2006 |

(Continued)

OTHER PUBLICATIONS

Chang, "Content-Aware Display Adaptation and Interactive Editing for Stereoscopic Images," IEEE Transactions on Multimedia, 2011, vol. 13, No. 4, pp. 1-13.

(Continued)

*Primary Examiner* — Qian Yang
(74) *Attorney, Agent, or Firm* — Sriram Srinivasan

(57) ABSTRACT

In some examples, a method includes determining, by a computing device, a plurality of regions of interest of an image for independently processing relative to a plane of interest; determining, by the computing device and for respective regions of interest of the plurality of regions of interest, a distance from objects within the respective regions of interest to the plane of interest; and processing, by the computing device and independently for the respective regions of interest, the respective regions of interest of the image based on the determined distance from the objects to the plane of interest.

17 Claims, 11 Drawing Sheets

Related U.S. Application Data

(60) Provisional application No. 62/374,572, filed on Aug. 12, 2016.

(51) Int. Cl.
*G06T 3/40* (2006.01)
*G06V 10/25* (2022.01)

(58) Field of Classification Search
CPC ... G06T 7/74; G06T 7/11; G06T 7/174; G06T 5/002; G06T 5/50; G06T 2207/20221
See application file for complete search history.

(56) References Cited

U.S. PATENT DOCUMENTS

| | | | |
|---|---|---|---|
| 2014/0111623 A1* | 4/2014 | Zhao | H04N 13/128 348/47 |
| 2014/0267626 A1 | 9/2014 | Lilagan | |
| 2014/0294233 A1 | 10/2014 | Osamura | |
| 2015/0156471 A1 | 6/2015 | Buerkle | |
| 2015/0186708 A1 | 7/2015 | Katz | |
| 2016/0171706 A1* | 6/2016 | Somanath | G06T 7/11 382/154 |
| 2016/0180142 A1* | 6/2016 | Riddle | G06V 40/107 382/124 |
| 2017/0325721 A1 | 11/2017 | Matsuda et al. | |

FOREIGN PATENT DOCUMENTS

| | | |
|---|---|---|
| WO | WO 2017-044343 | 3/2017 |
| WO | WO 2017/082100 A1 | 5/2017 |
| WO | WO 2018-165148 | 9/2018 |

OTHER PUBLICATIONS

CSM4220 Presentation, "Geometric Camera Calibration and Stereo Vision." Aberystwyth University, pp. 1-18.

Heikkila, "A Four-step Camera Calibration Procedure with Implicit Image Correction", IEEE Computer Society Conference on Computer Vision and Pattern Recognition, 1997, pp. 1106-1112.

Liu,"3D fingerprint reconstruction system using feature correspondences and pnor estimated finger model", Pattern Recognition, 2014. vol. 47, No. 1, pp. 178-193, XP028730385.

Whitepaper, "Obtaining Depth Information from Stereo Images.", Ensenso and IDS Imaging Development Systems, pp. 1-9, 2012.

International Search report for PCT International Application No. PCT/US2017/046529 dated Nov. 1, 2017, 5 pages.

\* cited by examiner

INDEPENDENTLY PROCESSING PLURALITY OF REGIONS OF INTEREST

CROSS REFERENCE TO RELATED APPLICATIONS

This application is a continuation of U.S. patent application Ser. No. 16/323,561, filed 6 Feb. 2019, now allowed, which is a U.S. 371 application based on PCT/US2017/046529, filed on 11 Aug. 2017, which claims the benefit of Provisional U.S. Patent Application No. 62/374,572, filed 12 Aug. 2016, the entire disclosure of each of which is incorporated herein by reference.

TECHNICAL FIELD

This disclosure relates to image processing.

BACKGROUND

Fingerprints, palm prints, or other biometric data may be used by a variety of government, commercial, residential or industrial entities for verifying the identity of an individual. Example applications include identifying individuals at border locations, confirming an identity for purposes of access control or authentication, or identifying an unknown individual during a forensic investigation. In such applications, friction ridge data or images containing other identifying features may be obtained and compared to an existing sample.

Friction ridge data may be obtained in a variety of ways. In one example, friction ridge data may be captured by pressing an extremity (e.g., a finger) against an ink source and then pressing and rolling the extremity onto a piece of paper. In another example, fiction ridge data may be captured by pressing or rolling the extremity against a hard surface (e.g., glass, silicon, or polymer) and capturing an image of the extremity with a sensor. In still another example, friction ridge data may be captured by taking an image of the extremity, which may be referred to as contactless print technology.

SUMMARY

Techniques of this disclosure include independent processing of a plurality of regions of an image such as a friction ridge image. For example, according to aspects of this disclosure, a computing device may determine a plurality of regions of interest (ROI) of a friction ridge image and determine, for each respective ROI, a representative distance from objects within a ROI to a plane of interest (e.g., an image plane defined by a camera that captures the image or another fixed plane). The computing device may also independently process each of the ROIs based on the determined distances. For example, the computing device may rescale, perform perspective correction, or perform other processing on the ROIs of the image. In this way, as described in greater detail below, the techniques may be used to compensate for variations in conditions when capturing a friction ridge image.

In some examples, a method includes determining, by a computing device, a plurality of regions of interest of an image for independently processing relative to a plane of interest; determining, by the computing device and for respective regions of interest of the plurality of regions of interest, a distance from objects within the respective regions of interest to the plane of interest; and processing, by the computing device and independently for the respective regions of interest, the respective regions of interest of the image based on the determined distance from the objects to the plane of interest.

The details of one or more examples are set forth in the accompanying drawings and the description below. Other features, objects, and advantages will be apparent from the description and drawings, and from the claims.

DETAILED DESCRIPTION

Figure 1:
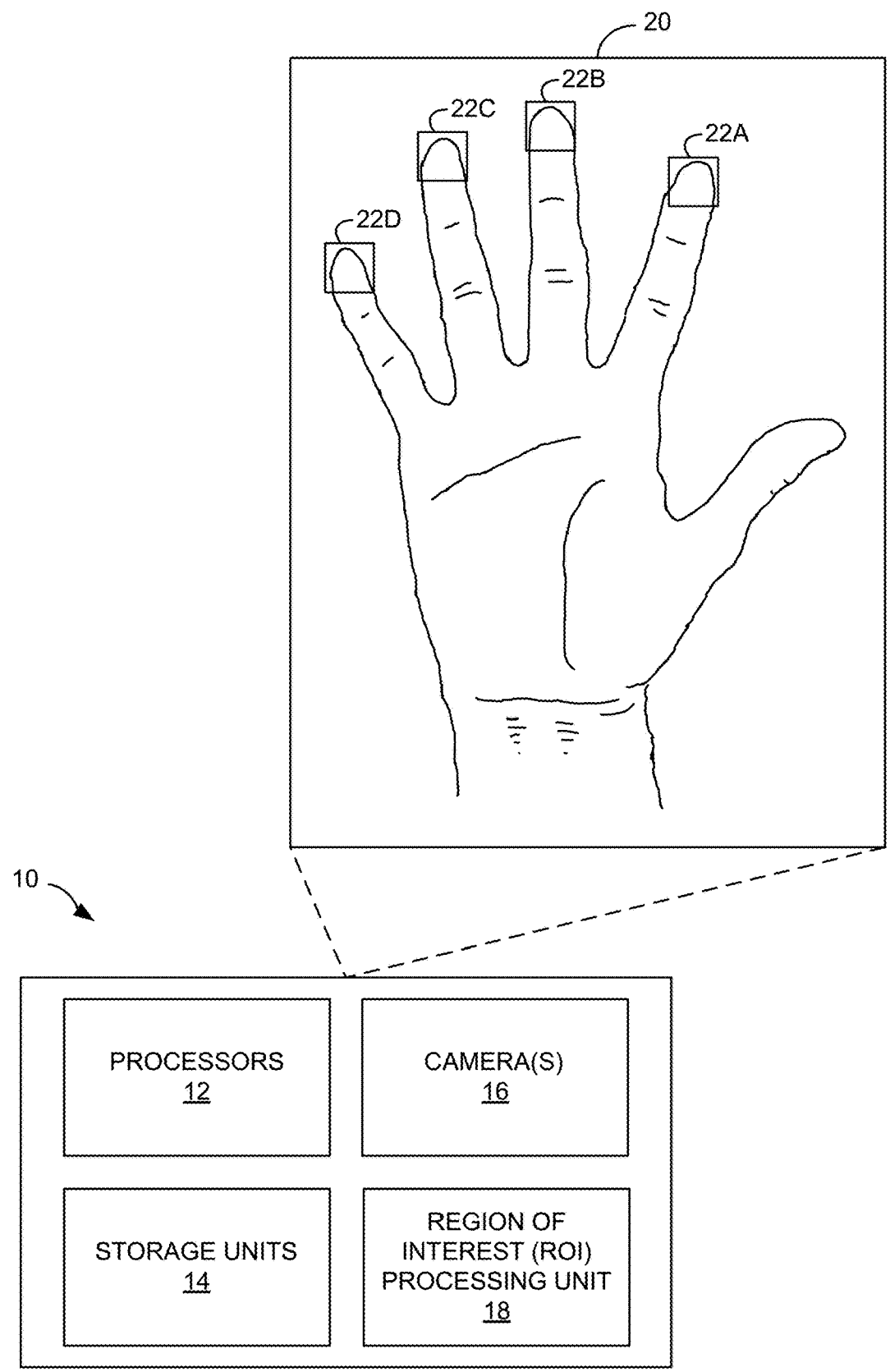
FIG. 1 is a block diagram illustrating an example computing device configured to independently process a plurality of regions of interest of an image, according to aspects of this disclosure.

Techniques of this disclosure include independent processing of a plurality of regions of an image, such as a friction ridge image. Historically, fingerprints and palm prints were acquired manually by having an individual put ink on their finger and pressing their finger and palm onto a piece of paper, resulting in a friction ridge image. Ink-based acquisition techniques may be both time consuming and noisy. For example, during the acquisition process the ink may bleed or become smeared on the paper. In addition, too much or too little ink may compromise the quality of the acquired print.

In some examples, friction ridge images may be digitally acquired. For instance, a subject may place a finger or palm on a glass or other transparent surface, and an image may be taken through the glass or another transparent surface. However, contact acquisition of friction ridge images (e.g., either ink based or digital images) may have a number of limitations. For example, contact-based print technologies may produce partial or degraded images due to improper hand placement, skin deformation, slippage and smearing, or sensor noise from wear and tear of surface coatings. Further, contact-based technologies often produce low-quality prints due to the uncontrollability and non-uniformity of hand pressure, as well as from the residues (e.g., oil, sweat, dirt) that can be present from previous prints.

Non-contact techniques have been developed that take an image of the hand at a distance from a fixed plane, such as a platen. Non-contact image acquisition devices may use a series of image processing algorithms to extract and enhance the prints from the raw image to be used for comparison against legacy prints (e.g., contact-based images). In order for non-contact prints to be accurately compared to legacy prints, the non-contact prints have to be of the same scale (e.g., in pixels per inch (PPI)) as the legacy prints.

For legacy prints, the scale is typically consistent because the prints are only acquired along the plane perpendicular to the imager, where the skin makes physical contact with the paper or platen. For non-contact prints, however, the object that is being imaged (e.g., such as a fingerprint, palm print, or the like) is not physically constrained to one specific plane, nor is the object physically constrained to an orientation that is perpendicular to the imager. These variables may result in an image where a region of the object being captured is located at a different distance from the imager (e.g., camera) than another region of the object. Due to the potentially differing distances of objects (or portions of objects), one scaling factor cannot be applied globally to an image to rescale the object for matching with legacy prints.

The techniques of this disclosure may, in some instances, address the technical problem of processing an image that includes objects (or portions of objects) that are positioned at varying distances from a camera that captures the image. For example, according to aspects of this disclosure, a computing device may determine a plurality of regions of interest (ROIs) within a friction ridge image. As described herein, a region of interest may generally correspond to a group of pixels of an image that comprises fewer than all of the pixels of the image. A region of interest may be defined by a particular area of the image (e.g., blocks of pixels of the image). In some instances, a region of interest may be processed independently from other areas of the image.

According to aspects of this disclosure, the computing device may determine a representative distance from objects within each of the ROIs to a plane of interest (e.g., an image plane defined by a camera that captures the image or another fixed plane) for each of the respective ROIs. The computing device may also independently process each of the ROIs based on the determined distance. In this way, the techniques may be an improvement in the technical field of image processing and/or non-contact friction ridge image acquisition. For example, by independently processing a plurality of ROIs, the resulting processed image may be more accurately compared to other print or digital images.

FIG. 1 is a block diagram illustrating an example computing device configured to independently process a plurality of regions of interest of an image, according to aspects of this disclosure. In the example of FIG. 1, computing device 10 includes processors 12, storage units 14, one or more cameras 16 and region of interest (ROI) processing unit 18. Computing device 10 may be configured to process image 20 by determining a plurality of regions of interest (ROIs) 22A-22D (collectively, ROIs 22) and independently processing ROIs 22.

Figure 3:
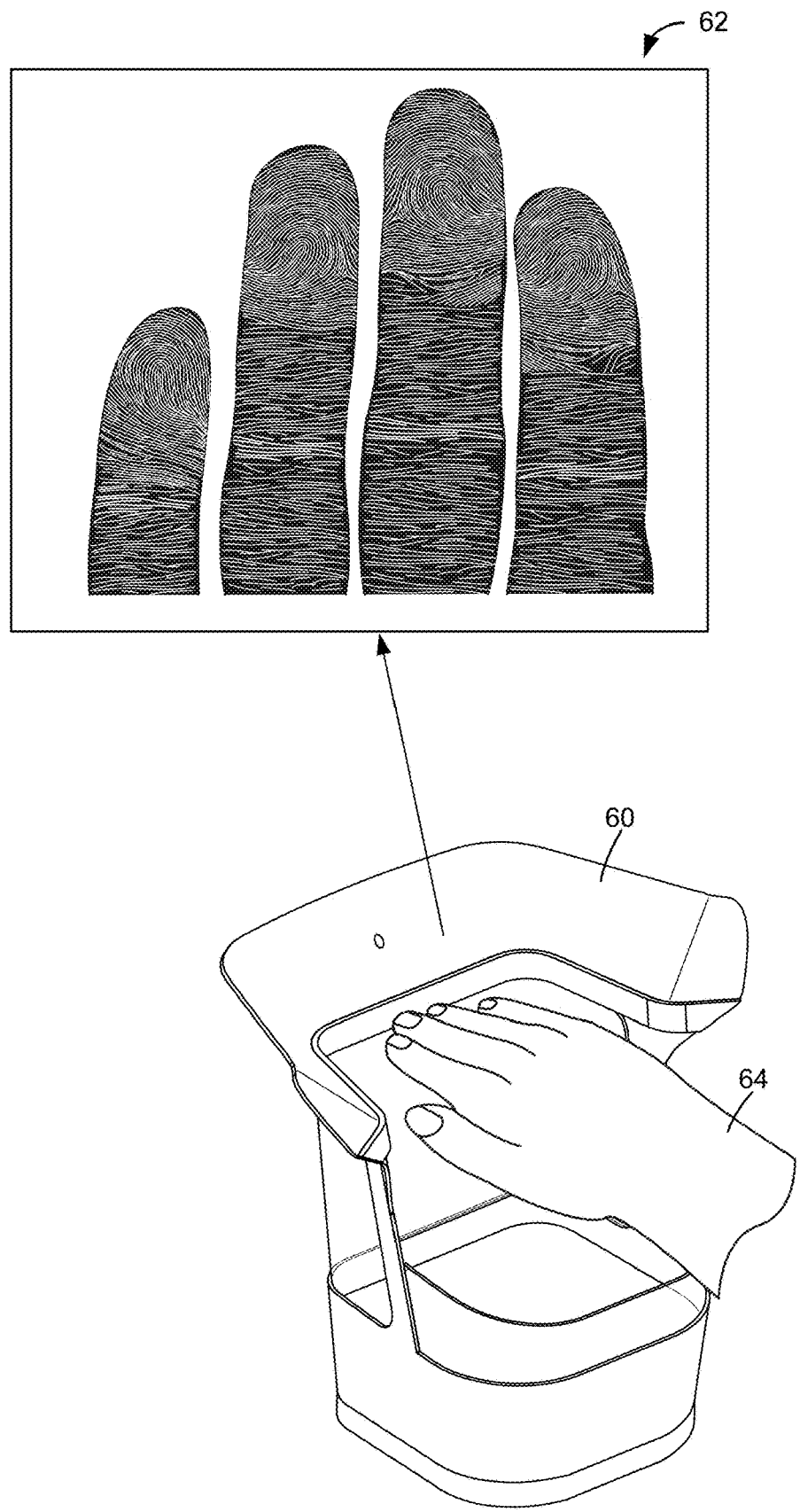
FIG. 3 illustrates an example image capture and processing system, according to aspects of this disclosure.

The functionality of computing device 10 may be implemented in hardware or in a combination of software and hardware, where requisite hardware may be provided to store and execute software instructions. Computing device 10 may include a variety of devices for processing and/or manipulating data. In one example, computing device 10 may be incorporated in an apparatus for capturing and/or processing friction ridge images (e.g., as illustrated in the example of FIG. 3).

While illustrated as a single computing device 10 for purposes of illustration, it should be understood that computing device 10 may include a plurality of individual components. For example, processors 12 may be included in a device that is separate from one or more cameras 16. Moreover, many other examples of computing device 10 may be used in other instances and may include a subset of the components included in example computing device 10 or may include additional components not shown in example computing device 10 of FIG. 1.

Processors 12, in one example, are configured to implement functionality and/or process instructions for execution within computing device 10. For example, processors 12 may be capable of processing instructions stored by storage units 14. Processors 12 may include, for example, microprocessors, digital signal processors (DSPs), application specific integrated circuits (ASICs), field-programmable gate array (FPGAs), or equivalent discrete or integrated logic circuitry.

Storage units 14 may include a computer-readable storage medium or computer-readable storage device. In some examples, storage units 14 include one or more of a short-term memory or a long-term memory. Storage units 14 may include, for example, random access memories (RAM), dynamic random access memories (DRAM), static random access memories (SRAM), magnetic hard discs, optical discs, flash memories, or forms of electrically programmable memories (EPROM) or electrically erasable and programmable memories (EEPROM). Storage units 14 may also include network or Cloud based databases or servers that reside outside of the computing device 10.

Storage units 14 may store an operating system (not shown) that controls the operation of components of computing device 10. For example, the operating system may facilitate the communication of ROI processing unit 18 with processors 12 and storage units 14. In some examples, storage units 14 are used to store program instructions for execution by processors 12. Storage units 14 may also be configured to store information within computing device 10 during operation. Storage units 14 may be used by software or applications (e.g., ROI processing unit 18) executed by processors 12 of computing device 10 to temporarily store information during program execution.

One or more cameras 16 may include an image sensor, an image processor, and/or any other components for capturing images. As described in greater detail below, in some examples, cameras 16 may include at least two cameras for capturing image 20 from different perspectives. In some instances, cameras 16 may be chosen in part based on a response to light in a chosen wavelength. For example, cameras 16 may comprise a five-megapixel (5 MP) image sensor due to a particular response in the blue wavelength.

Cameras 16 may be configured to capture images (e.g., such as image 20) of one or more friction ridge surfaces. A friction ridge surface may include any area of skin having durable morphological features or minutiae, including unique ridges, creases, scars and pores. Friction ridge surfaces are most commonly present on a person's hands or feet, and in particular, on phalange, on the sole of a person's feet or toes, on palmar surfaces of a hand, including the palm, fingers, the area between two joints on a finger, the area between two fingers, and fingertips. Minutiae can include, for example, a ridge ending (e.g., the abrupt end of a ridge), a ridge bifurcation (e.g., a single ridge that divides into two ridges), a short or independent ridge (e.g., a ridge that commences, travels a short distance, and then ends), an island (e.g., a single small ridge inside a short ridge or ridge ending that is not connected to all other ridges), a ridge enclosure (e.g., a single ridge that bifurcates and reunites shortly afterward to continue as a single ridge), a spur (e.g., a bifurcation with a short ridge branching off a longer ridge, a crossover or bridge (e.g., a short ridge that runs between two parallel ridges, a delta (e.g., a Y-shaped ridge meeting), a core (e.g., a U-turn in the ridge pattern) or the like.

In some instances, cameras 16 may be configured to optimally photograph or capture an image of a user's hand (as illustrated by image 20 of FIG. 1). For example, cameras 16 may use an electronic rolling shutter (ERS) or a global reset release shutter (GRRS). GRRS and ERS differ in terms of when the pixels become active for image capture. GRRS starts exposure for all rows of pixels at the same time, however, each row's total exposure time is longer than the exposure time of the previous row. ERS exposes each row of pixels for the same duration, but each row begins that row's exposure after the previous row has started.

In some instances, cameras 16 may use GRRS instead of ERS, in order to eliminate the effects of image shearing. Image shearing is an image distortion caused by non-simultaneous exposure of adjacent rows (e.g. causing a vertical line to appear slanted). Hand tremors produce motion that can lead to image shearing. Therefore, GRRS can be used to compensate for hand tremors and other movement artifacts. To counteract the blurring that may occur with GRRS, cameras 16 may include an illumination shield or may implement other processing techniques to reduce the effects of ambient light.

As noted above, in instances in which cameras 16 are configured to capture image 20 for use in a non-contact friction ridge imaging system, the object that is being imaged (e.g., such as a fingerprint, palm print, or the like) is not physically constrained to one specific plane, nor is the object physically constrained to an orientation that is perpendicular to the imager. These variables may result in the objects being imaged being located at different distances away from cameras 16. Due to the potentially differing distances from the objects (or portions of objects, such as portions of fingers, palms, or the like) to cameras 16, it may not be possible to apply one scaling factor to image 20 when rescaling image 20 (or a portion of image 20) to match with other prints.

According to aspects of this disclosure, ROI processing unit 18 may be responsible for processing image 20 such that at least a portion of image 20 may be accurately compared to other images obtained using contact or non-contact based techniques. In some instances, ROI processing unit 18 may include instructions executed by processors 12 of computing device 10 to perform the functions attributed to ROI processing unit 18 described herein.

ROI processing unit 18 may determine ROIs 22 of image 20. ROI processing unit 18 may also determine distances between objects within ROIs 22 and a plane of interest, such an image plane of cameras 16 or another fixed plane such as a platen of an apparatus that includes computing device 10. The objects within ROIs 22 may be any objects or portions of objects represented by image 20. For example, in instances in which image 20 is a friction ridge image, objects being imaged may include at least a portion of a person's hands or feet, and in particular, a phalange, a sole of a person's feet or toes, palmar surfaces of a hand, including the palm, fingers, an area between two joints on a finger, an area between two fingers, fingertips, or the like. Accordingly, the determined distance for objects within each of ROIs 22 may be a representative distance for all objects represented in ROIs 22 of image 20. That is, despite a particular ROI 22 potentially including more than one object (e.g., a fingertip or portion of a fingertip that includes a plurality of ridges), ROI processing unit 18 may determine a distance that represents the distance between all objects within the area of image 20 defined by the particular ROI 22 and the plane of interest.

In some examples, ROI processing unit 18 may determine the distances between objects of ROIs 22 and a plane of interest using two of cameras 16. For example, as described in greater detail herein, ROI processing unit 18 may determine a disparity in perspectives captured by two of cameras 16 and use the determined disparity to determine the distance between objects within ROIs 22 and a plane of interest. However, while certain techniques are described herein with respect to stereo cameras, it should be understood that other techniques may be used to determine distances between objects represented by image 20 and a plane of interest. For example, an infrared (IR) camera, an ultrasound device, a device using structured light comprising and an LCD projector or patterned laser projector to project a pattern on an object, a modulated light scanner (e.g., to determine fringe patterns), a device suing laser triangulation comprising determining the location of a dot or curved line reflected from an object, a time of flight (TOF) camera, a device using a machine-readable pattern of landmarks in concert with a camera, an IR distance sensor, an IR light curtain or a variety of other devices may be capable of measuring distance between objects represented by image 20 and a plane of interest. In such examples, data that indicates the distances may be mapped to image 20 such that ROI processing unit 18 may use the distances to independently process ROIs 22.

ROI processing unit 18 may then independently process ROIs 22 based on the determined respective distances. For example, ROI processing unit 18 may rescale each of ROIs to a common scale in pixels per inch (PPI). In some examples, ROI processing unit 18 may scale ROIs 22 (and, more broadly, other areas of image 20) to 500 PPI or 1000 PPI, because many government agencies or other entities may store legacy images to which image 20 may be compared in 500 PPI or 1000 PPI. In other examples, ROI processing unit 18 may rescale ROIs 22 to any other resolution. In some instances, ROI processing unit 18 may additionally or alternatively perform perspective correction of ROIs 22.

Figure 2:
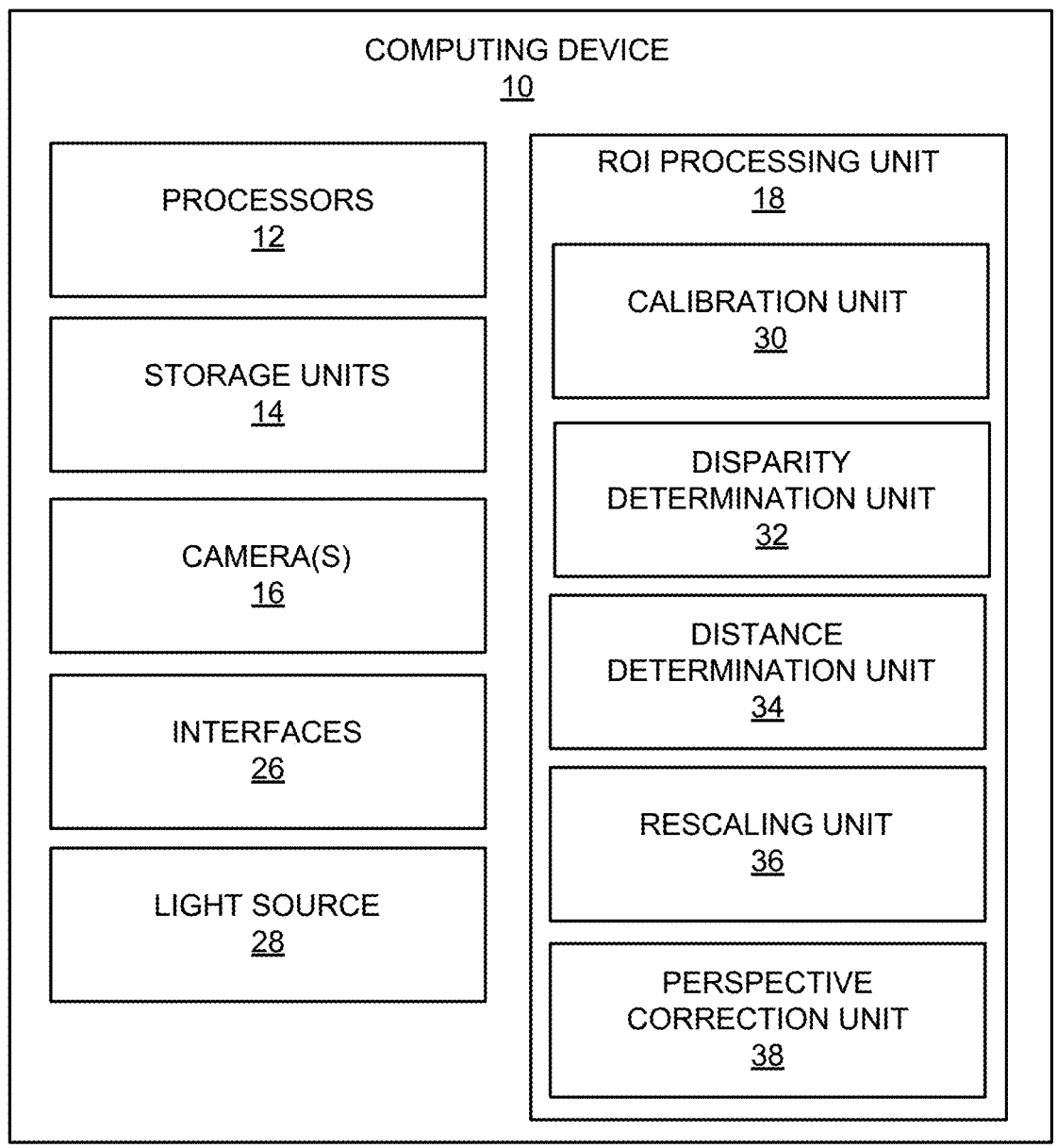
FIG. 2 is a block diagram illustrating the example computing device of FIG. 1 in greater detail.

FIG. 2 is a block diagram illustrating the example computing device of FIG. 1 in greater detail. The example shown in FIG. 2 includes processors 12, storage units 14, one or more cameras 16, interfaces 26 and a light source 28. ROI processing unit 18 of computing device 10 includes calibration unit 30, disparity determination unit 32, distance determination unit 34, rescaling unit 36, and perspective correction unit 38.

Again, the architecture of computing device 10 illustrated in FIG. 2 is shown for exemplary purposes only. In other examples, computing device 10 may be configured in a variety of other ways having additional, fewer, or alternative components than those shown in FIG. 2. For example, in some instances, computing device 10 may include a number of additional components such as a power supply, one or more displays, or the like.

As noted above, processors 12 may be configured to implement functionality and/or process instructions for execution within computing device 10, while storage units 14 may include a computer-readable storage medium or computer-readable storage device. Cameras 16 may be configured to capture images (e.g., such as image 20) of a friction ridge surface.

Computing device 10 may utilize interfaces 26 to communicate with external devices via one or more wired or wireless connections. Interfaces 26 may include network interfaces cards, universal serial bus (USB) interfaces, optical interfaces, or any other type of interface capable of sending and receiving information via a particular communication standard. Examples of network interfaces may include Ethernet, Wi-Fi, or Bluetooth radios.

Light source 28 may include light emitting diodes (LEDs) or other components for illuminating objects prior to capturing images of the objects with cameras 16. Human skin has been found to have higher reflectivity in the green and blue portions of the visible light spectrum, thus emitting light with wavelengths peaking in the blue and green portions of the visible light spectrum can help to more clearly illuminate details on a friction ridge surface of a user's hand. Accordingly, light source 28 may include LEDs that emit light peaking in the blue wavelength (e.g., in the range of 440 to 570 nanometers (nm)).

Light emitted by light source 28 may be of varying power levels. Light source 28 may be, in some instances, paired with one or more light guides to direct the output of light source 28 in a uniform manner. In one instance, light guides are made of a polycarbonate tube lined with enhanced specular reflector (ESR) film and a turning film. In some instances, the light guides may collimate the emitted light so that each ray is parallel, reducing light scattering and undesired reflections.

According to aspects of this disclosure, as noted above with respect to FIG. 1, ROI processing unit 18 may determine respective distances between objects within ROIs 22 and a plane of interest (e.g., an image plane of cameras 16 or another fixed plane) for each of ROIs 22. In instances in which data from cameras 16 is used to determine distances, calibration unit 30 may be configured to calibrate cameras 16. For example, calibration unit 30 may calibrate each of cameras 16 and correct for distortions within the lenses of cameras 16.

In some examples, calibration unit 30 may perform the calibration by taking multiple images of a checkerboard with known square sizes across the full field of view of each of cameras 16. Calibration unit 30 may use the intersections of the black and white squares to find points in the taken image. Calibration unit 30 may use the determined points to calculate the camera intrinsic properties as well as the lens distortion. Calibration unit 30 may use such information to undistort the images.

In some examples, calibration unit 30 may also determine the extrinsic properties of cameras 16 (e.g., the physical relationship between cameras 16). Calibration unit 30 may determine the extrinsic properties by imaging a checkerboard pattern, with known black and white square sizes, with each of cameras 16 at the same time, but at different distances, in different planes, and with different orientations relative to cameras 16. Calibration unit 30 may determine the intersection of the black and white squares in images from each of cameras 16 and calculate a rotation and a translation of one of cameras 16 relative to another of cameras 16. After determining the extrinsic properties of cameras 16, calibration unit 30 may rectify images captured by cameras 16 such that calibration unit 30 may search for correspondences in the images in one dimension instead of two dimensions.

According to some aspects, calibration unit 30 may use OpenCV to calibrate cameras 16. For example, calibration unit 30 may apply the calibrateCamera function of OpenCV to determine intrinsic and extrinsic parameters of several views of a calibration pattern. In other examples, calibration unit 30 may use one or more techniques described in the document "A Four-step Camera Calibration Procedure with Implicit Image Correction," by Heikkila et al, Infotech Oulu and Department of Electrical Engineering, June 1997 to calibrate cameras 16.

Calibration unit 30 may be configured to calibrate cameras 16 at periodic intervals. For example, calibration unit 30 may calibrate cameras 16 at a time of installation of an apparatus that contains computing device 10. In other examples, calibration unit 30 may calibrate cameras 16 on a particular schedule, such as every six months, every year, or the like.

According to aspects of this disclosure, upon cameras 16 being calibrated, disparity determination unit 32 may determine a disparity between perspectives captured by cameras 16. For example, disparity determination unit 32 may initially determine a disparity between a perspective captured by a first camera of cameras 16 and a perspective captured by a second camera of cameras 16. In one example, disparity determination unit 32 may determine a disparity map by locating corresponding feature points of images of the same object (e.g., a hand) taken from each of the first and second cameras 16 and determining a disparity between the feature points.

In some instances, disparity determination unit 32 may determine the distance map by calculating a difference in pixel space between the same feature points in each image. In an example for purposes of illustration, disparity determination unit 32 may determine a location of a feature point (e.g., a block of pixels) in a first version of an image (such as image 20 of FIG. 1) as captured by a first camera of cameras 16. For example, disparity determination unit 32 may determine the location using a Cartesian or a similar coordinate system. Disparity determination unit 32 may also determine a location of the same feature point in a second version of the image as captured by a second camera of cameras 16. Disparity determination unit 32 may determine the disparity as a difference in the number of pixels between the determined location in the first version of the image and the determined location in the second version of the image.

In some instances, the density of the disparity map may be dependent on the number of reliably matched feature points that can be identified in each of the images. For example, disparity determination unit 32 may initially determine similar feature points by determining a sum of absolute differences (SAD) (or other similarity metric) between blocks of pixels of the first image and blocks of pixels of the second image. In some instances, disparity determination unit 32 may only determine disparities for blocks having differences that are less than a particular threshold.

In some instances, the block size used for feature points and/or the similarity threshold may be variable depending on the application in which computing device 10 is used. For example, in a high security application in which the processed image is compared to another image with a relatively high degree of scrutiny, disparity determination unit 32 may determine disparities for relatively small blocks of pixels and/or set the similarity threshold such that a disparity is only determined for blocks of pixels having a high degree of similarity.

Disparity determination unit 32 may determine a disparity map for an entire image or for a subset of objects in the image. For example, in some instances, prior to determining the disparities, disparity determination unit 32 or another unit of ROI processing unit 18 may apply a segmentation algorithm to an image to determine particular regions of the image for which to determine disparities. In another example, disparity determination unit 32 may determine disparities for any objects of an image that are similar to objects of another image.

According to aspects of this disclosure, distance determination unit 34 may determine, for respective ROIs of an image (e.g., such as ROIs 22 of FIG. 1), a distance between objects represented within the ROIs of the image and a plane of interest (e.g., such as an image plane defined by cameras 16 or another fixed plane between the objects and cameras 16). The distance may be a Euclidean distance between the object(s) and the plane of interest.

In some examples, distance determination unit 34 or another component of ROI processing unit 18 may be responsible for determining ROIs of an image (e.g., the areas of the image for which to determine distances) prior to determining distances. For example, distance determination unit 34 may segment ROIs from an image using a segmentation algorithm (e.g., a segmentation algorithm designed to segment skin from a background of the image). Distance determination unit 34 may then determine distances for the segmented ROIs.

In other examples, distance determination unit 34 may initially determine a distance map that indicates the distance from objects represented by an image to a plane of interest. For example, as described in greater detail with respect to FIG. 5, distance determination unit 34 may determine distances for objects represented by portions of an image (e.g., groups of pixels such as blocks of pixels) and include the determined distances for the portions of the image in a distance map that corresponds to the image. Distance determination unit 34 may then determine ROIs from the portions of the image for which determined distances have been determined in the distance map.

For example, according to some aspects, distance determination unit 34 may determine ROIs from all or a subset of the portions of the image included in the distance map. In some examples, distance determination unit 34 may apply a segmentation algorithm or perform other calculations to determine ROIs from the distance map. In such examples, distance determination unit 34 may determine ROIs by merging one or more areas of the distance map.

Distance determination unit 34 may assign distances to determined ROIs based on the distances of corresponding areas of the distance map. For example, in instances in which a determined ROI aligns with a particular area of the distance map for which a single distance has been determined, distance determination unit 34 may assign the distance to the ROI. In instances in which a determined ROI aligns with more than one area of the distance map for which more than one distance has been determined, distance determination unit 34 may apply a smoothing function (e.g., such as an averaging function) to determine a representative distance for the ROI. In this way, distance determination unit 34 may determine representative distances for objects within the ROIs of the image.

According to aspects of this disclosure, in some examples, distance determination unit 34 may determine distances based on a disparity between two of cameras 16 (e.g., as determined by disparity determination unit 32). However, as noted above, while certain techniques are described herein with respect to stereo cameras, it should be understood that distance determination unit 34 may additionally or alternatively use other techniques to determine distances between objects represented in an image and a plane of interest.

In instances in which distance determination unit 34 uses cameras 16 to determine distances, distance determination unit 34 may determine the distances based on disparities, e.g., as determined by disparity determination unit 32. In one example, distance determination unit 34 may determine distances by multiplying a camera separation distance between cameras 16 by a focal length of the cameras 16 and dividing by a determined disparity. In other examples, distance determination unit 34 may determine distances based on disparity using a variety of other calculations.

In some examples, distance determination unit 34 may determine disparities from a disparity map generated by disparity determination unit 32. For example, in some instances, there may be a 1:1 correspondence between a disparity map generated by disparity determination unit 32 and a distance map determined by distance determination unit 34. In this example, disparity determination unit 32 may determine a disparity map that includes disparities for a number of areas of the image. Distance determination unit 34 may determine a distance map that includes distances for the corresponding areas of the image of the disparity map. Distance determination unit 34 (or another component of ROI processing unit 18) then determines ROIs that include all or a subset of the areas of the distance map and assigns distances to the ROIs based on the distances from the distance map.

In other examples, distance determination unit 34 may determine a distance map for a subset of areas of an image smaller than the areas for which disparity determination unit 32 determines the disparity map. In either case, distance determination unit 34 may determine ROIs that include all or a subset of the areas of the distance map and assign distances to the ROIs based on the distances from the distance map.

After determining the respective distances for ROIs 22, rescaling unit 36 and/or perspective correction unit 38 may independently process each of the ROIs. For example, rescaling unit 36 may determine a resolution of each of the ROIs based on the determined distance. In an example for purposes of illustration, rescaling unit 36 may determine the resolution by dividing a focal length of a lens of cameras 16 by a product of a distance from the lens to the object and a pixel size of an imaging sensor of cameras 16. Rescaling unit 36 may then downscale the resolution of each of the ROIs to a particular resolution. For example, rescaling unit 36 may apply any variety of downscaling and/or down sampling algorithms. For example, rescaling unit 36 may apply a low-pass spatial filter, followed by removing points (conceptually). In another example, rescaling unit 36 may resample using a local interpolating function. In some examples, rescaling unit 36 may apply a low-pass or other filter in conjunction with performing interpolation. Example filters that may be used by rescaling unit 36 may include a bicubic filter, a sinc filter, a Lanczos filter, or a wide variety of other filters.

Additionally or alternatively, perspective correction unit 38 may process the ROIs by reprojecting the ROIs. For example, perspective correction unit 38 may change the location magnification of portions of the ROIs to change the perspective of the ROIs. Accordingly, whereas rescaling unit 36 may apply techniques to rescale ROIs to a single resolution, perspective correction unit 38 may apply filtering and/or interpolation techniques that vary linearly across the ROI being processed. Perspective correction unit 38 may, in some instances, variants of any of the techniques described with respect to rescaling unit 36 in order to vary the resolution across ROIs.

ROI processing unit 18 may output processed images (or processed portions of images defined by the ROIs). For example, ROI processing unit 18 may output data that represents the processed images to another external device via interfaces 26. In other examples, ROI processing unit 18 may store data that represents the processed images to storage units 14.

It should be understood that the components of ROI processing unit 18 illustrated in FIG. 2 are provided for purposes of example only, and that other examples may have more, fewer, or an alternative arrangement of components than those shown. For example, as noted above, computing device 10 may determine distances using components other than cameras 16. In such an example, ROI processing unit 18 may not include disparity determination unit 32.

FIG. 3 illustrates an example image capture and processing system, according to aspects of this disclosure. For example, FIG. 3 illustrates one example of an apparatus 60 that may incorporate computing device 10 for generating a friction ridge image 62 of a user 64. As shown in the example, user 64 may place a hand at some distance above apparatus 60 when image 62 is captured. According to aspects of this disclosure, as described herein, the techniques may be used to compensate for variations in the position of the hand of user 64 relative to apparatus 62.

Figure 4:
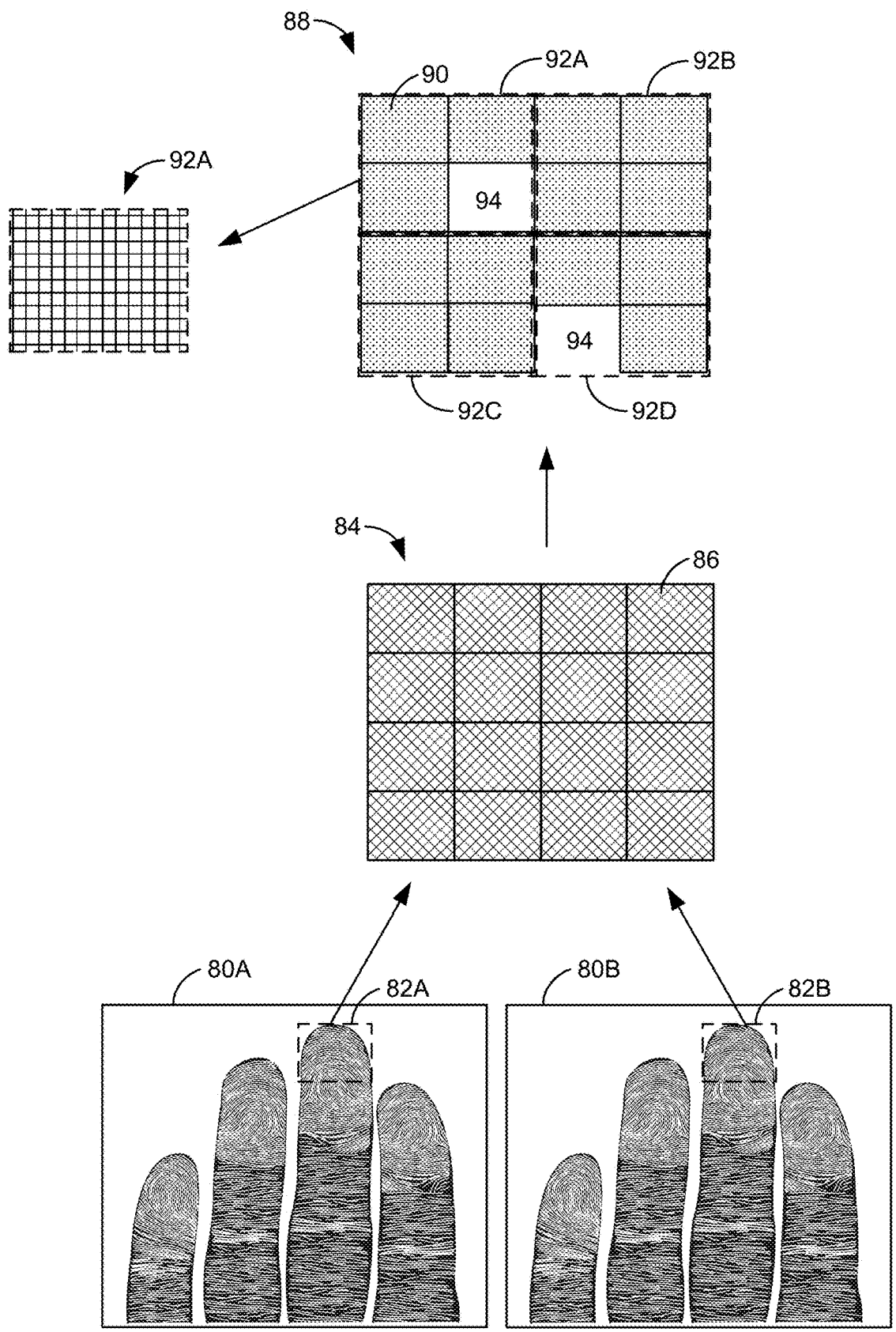
FIG. 4 is conceptual diagram illustrating an example of a disparity map and an example of a distance map, according to aspects of this disclosure.

FIG. 4 is conceptual diagram illustrating an example of a disparity map and an example of a distance map, according to aspects of this disclosure. Although described with respect to computing device 10 (FIGS. 1 and 2), it should be understood that other devices may be configured to perform a process the same as or similar to that of FIG. 7.

In the example of FIG. 4, cameras 16 of computing device 10 capture a first image 80A from a first perspective and a second image 80B from a second perspective. For ease of illustration, ROI processing unit 18 selects a portion of first image 82A and a portion of second image 82B for which to determine a corresponding disparity map 84. It should be understood that, in other examples, ROI processing unit 18 may determine disparity map 84 for the entire image or another portion of the image.

ROI processing unit 18 determines respective disparities of a number of areas 86 corresponding to areas of first image 80A and second image 80B. In the example of FIG. 4, areas 86 of disparity map 84 are contiguous, block-sized areas. However, in other examples, areas 86 may be sized and/or shaped differently. Areas 86 also need not be contiguous. For example, in some instances, ROI processing unit 18 may only determine disparities for a subset of areas 86 that satisfy a similarity threshold. That is, ROI processing unit 18 may only determine disparities for areas of first image 80A that are sufficiently similar to areas of second image 80B. In some examples, as described above with respect to FIG. 2, ROI processing unit 18 may determine respective disparities for each of areas 86 in the pixel space.

According to aspects of this disclosure, ROI processing unit 18 may also determine a disparity map 88. ROI processing unit 18 determines respective distances to a plane of interest for objects included within a number of portions 90 of an image corresponding first image 80A and second image 80B. In the example of FIG. 4, the size and shape of portions 90 of distance map 88 generally correspond to areas 86 of disparity map 84. However, distance map 88 includes a number of holes 94 for which distances are not available. In other examples, portions 90 may be sized and/or shaped differently, may be contiguous, or may include more or fewer than those shown.

ROI processing unit 18 determines distances to a plane of interest for objects represented within a plurality of ROIs 92A-92D from portions 90 of distance map 88. In the example shown in FIG. 4, each of ROIs 92A-92D corresponds to more than one of portions 90. Accordingly, in this example, ROI processing unit 18 may further process the distances of portions 90, e.g., by applying a smoothing factor, averaging, or otherwise combining the distances of portions. That is, ROI processing unit 18 may merge portions 90 to determine respective distances for ROIs 92A-92D.

In other examples, ROIs 92A-92D may correspond to a single portion of distance map 88. In such examples, ROI processing unit 18 may simply assign the distance of a respective portion of distance map 88 to a corresponding ROI.

According to aspects of this disclosure, in some examples, ROIs 92A-92D may be determined based on distance map 88. That is, ROI processing unit 18 may determine ROIs 92A-92D by identifying portions of distance map 88 that include objects that are approximately the same distance from a plane of interest. In other examples, portions 90 of distance map 88 may be determined based on ROIs 92A-92D. That is, ROI processing unit 18 may initially segment the image into ROIs 92A-92D (e.g., using a segmentation algorithm or based on disparity map 84) and determine the size and shape of portions 90 (and distances for portions 90) based on the area defined by ROIs 92A-92D.

It should be understood that the example of FIG. 4 is provided for purposes of illustration only. That is, the number of ROIs, the granularity of the disparity map (e.g., the size of the blocks), the granularity of the distance map, the techniques for merging portions of the distance map, and the like may all be variable depending on the characteristics of the system in which the techniques are implemented. For example, relatively high security applications may require relatively high precision (e.g., small blocks sizes, no merging or limited merging, and the like). Lower security applications (or applications requiring a high rate of speed to process images) may allow for relatively lower precision (e.g., larger blocks sizes, merging of distances, and the like).

Figure 5:
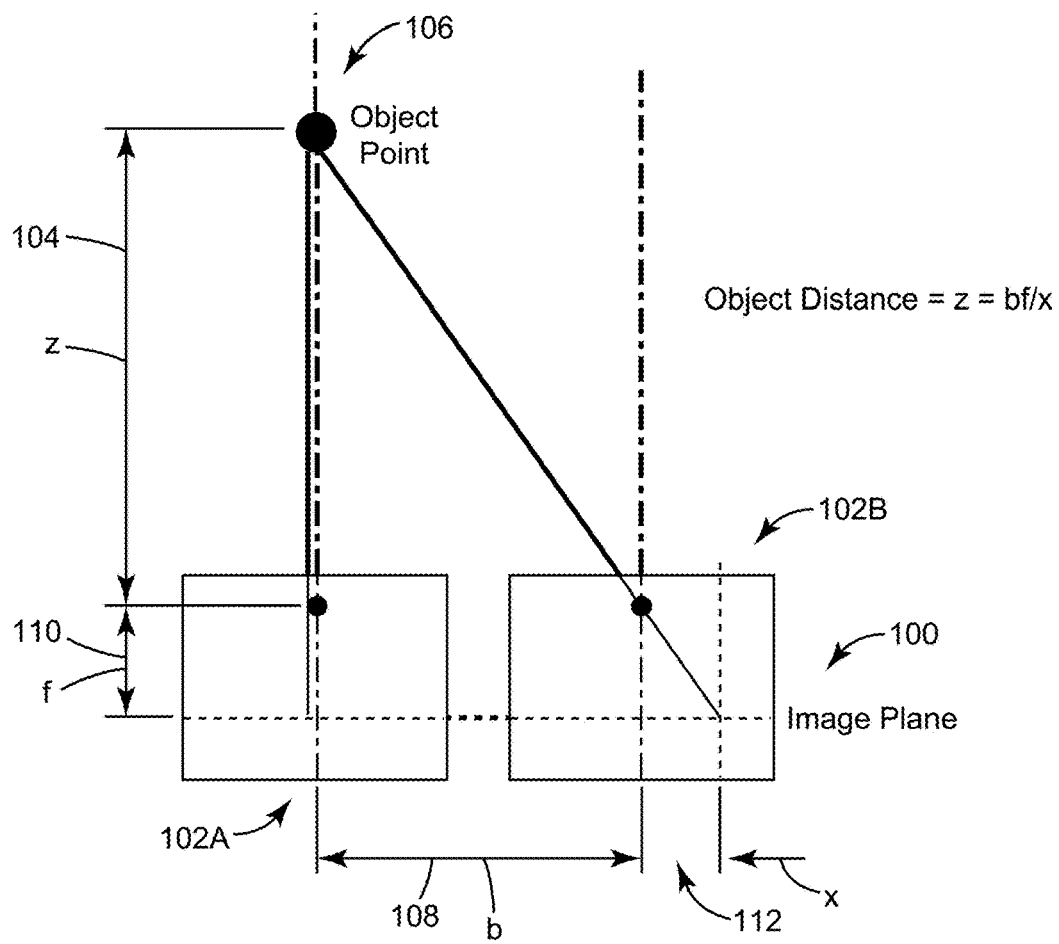
FIG. 5 is a conceptual diagram illustrating an example technique for determining distances, according to aspects of this disclosure.

FIG. 5 is a conceptual diagram illustrating an example technique for determining distances based on a disparity between cameras, according to aspects of this disclosure. For example, FIG. 5 illustrates an image plane 100 of a first image 102A and a second image 102B, a distance 104 between an object point 106 and a focal point of first image 102A, a separation distance 108 between a first camera that captures first image 102A and a second camera that captures image 102B, a focal length 110 between the camera center and image plane 100, and a disparity 112 between first image 102A and second image 102B.

According to some aspects of this disclosure, ROI processing unit 18 may determine distances for objects included within respective ROIs based on the techniques shown in FIG. 5. For example, ROI processing unit 18 may determine a distance map (e.g., distance map 88) based on equation (1) below:

$$z = bf/x \quad (1)$$

where z is the distance 104 between an object point 106 and a focal point of first image 102A, b is the separation distance 108 between a first image camera that captures image 102A and second camera that captures image 102B, f is the focal length 110 between the camera center and image plane 100, and x is the disparity 112 between a first image 102A and a second image 102B.

Figure 6:
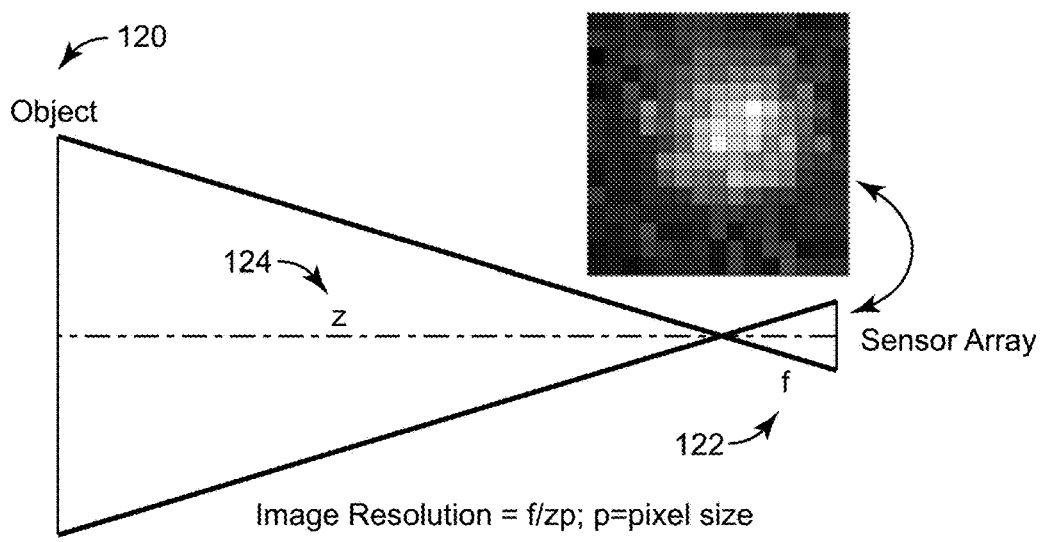
FIG. 6 is a conceptual diagram illustrating an example technique for determining an image resolution for rescaling.

FIG. 6 is a conceptual diagram illustrating an example technique for determining an image resolution for rescaling. For example, in order to properly rescale ROIs, ROI processing unit 18 may determine an initial resolution of respective ROIs. ROI processing unit 18 may determine a resolution of an image of an object 120 based on a focal length 122 of a lens used to capture the image on a sensor array of the camera, a distance 124 of the object 120 to the lens used to capture the image, and a pixel size p of an imaging sensor used to capture the image.

In some examples, ROI processing unit 18 may determine a resolution of a particular ROI based on equation (2) below:

$$R=f/zp \qquad (2)$$

where R is a resolution of the ROI, f is the focal length 122 of a lens used to capture the image on a sensor array of the camera, z is the distance 124 of the object 120 to the lens used to capture the image, and p is the pixel size of an imaging sensor used to capture the image. ROI processing unit 18 may then downscale the resolution of each of the ROI to a particular resolution, e.g., using a variety of downscaling, filtering or interpolation algorithms.

Figure 7:
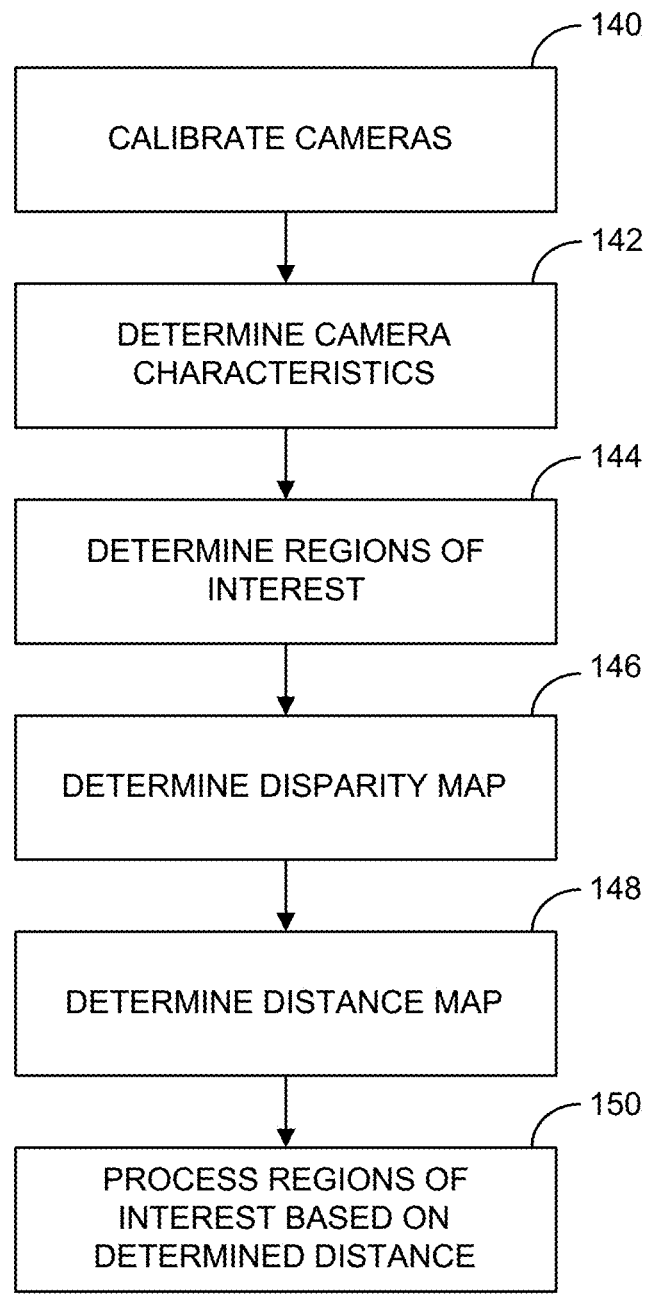
FIG. 7 is a flow diagram illustrating an example process for independently processing a plurality of regions of interest of an image, according to aspects of this disclosure.

FIG. 7 is a flow diagram illustrating an example process for independently processing a plurality of regions of interest of an image, according to aspects of this disclosure. Although described with respect to computing device 10 (FIGS. 1 and 2), it should be understood that other devices may be configured to perform a process the same as or similar to that of FIG. 7.

In the example of FIG. 7, ROI processing unit 18 calibrates one or more cameras responsible for capturing an image, such as a friction ridge image (140). In some examples, as described above with respect to calibration unit 30, ROI processing unit 18 may calibrate the cameras to correct for distortions associated with components of the cameras. ROI processing unit 18 also determines camera characteristics (142). For example, ROI processing unit may determine extrinsic properties of the cameras, such as a physical relationship between the cameras.

ROI processing unit 18 also determines ROIs of the image (144). For example, as noted above, ROI processing unit 18 may segment the image into a plurality of ROIs. ROI processing unit 18 also determines a disparity map (146) and determines a distance map (148). In some examples, the steps shown in FIG. 7 may be reordered such that step 144 follows step 148, as ROI processing unit 18 may determine the ROIs based on a distance map determined at step 148. In either case, ROI processing unit 18 may determine the disparity map (146) based on a disparity between objects of an image captured by a first camera and corresponding objects of another image captured by a second camera. ROI processing unit 18 may then determine the distance map (148) based on the disparity map.

ROI processing unit 18 may then process respective ROIs based on the determined distance for each ROI (150). For example, ROI processing unit may rescale, reproject, or perform other processing to produce an accurate representation of objects of the image relative to a plane of interest.

It should be understood that the techniques described with respect to FIG. 7 are provided for illustrative purposes and that other techniques are within the scope of this disclosure. For example, other example processes may include more, fewer, or an alternative arrangement of steps than those shown in the example of FIG. 7.

Techniques of FIGS. 1-7 describe, for example, determining, for respective regions of interest of a set of regions of interest, a distance from objects within the respective regions of interest to the plane of interest, and further processing, independently for the respective regions of interest, the respective regions of interest of the image based on the determined distance from the objects to the plane of interest. These techniques may use an equation such as z=bf/x as described in FIG. 5; however, other techniques may also be used as described in FIGS. 8-11. FIGS. 8-11 describe techniques for generating one or more look-up tables (e.g., disparity-to-depth and/or depth-to-PPI tables) and fitting a polynomial curve that maps disparities to depths (e.g., distances between camera and object). These techniques may include (1) performing global rescaling (2) performing fingertip segmentation, and (3) rescaling the regions of interest (for example, the fingertips). As described in this disclosure, rescaling is performed because a capture device and corresponding matching components may require images to have a resolution of a certain X pixels per inch (PPI). Stereo photogrammetry may be used to estimate the distance of the user's fingertips (or any other object of interest) from the main camera, and compute scale factors in order to resize the fingertip images, such that each fingertip image has a PPI of X. Each fingertip may be scaled according to that fingertip's own scale factor, since the fingertips may reside at different depths from the main camera.

Figure 8:
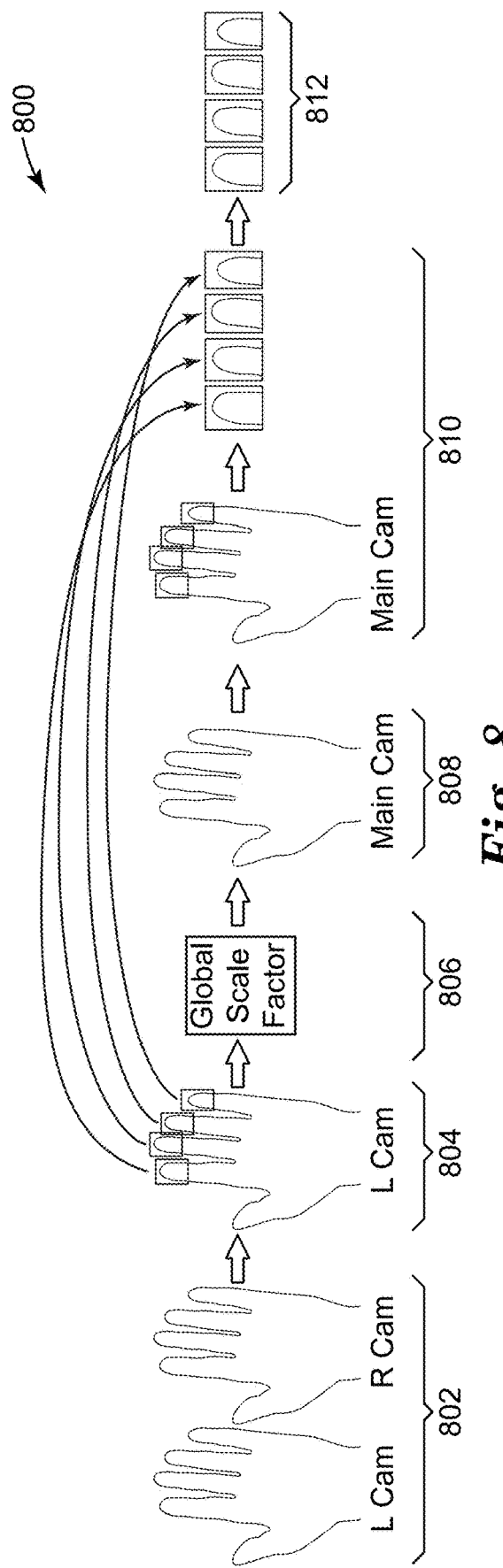
FIG. 8 illustrates an example fingerprint rescaling pipeline, in accordance with techniques of this disclosure.

FIG. 8 illustrates an example fingerprint rescaling pipeline 200, in accordance with techniques of this disclosure. Pipeline 200 may include various stages, which may be implemented by one or more computing devices. The operations described in FIGS. 8-11 may be performed by one or more computing devices, which may be included within an image capture device or communicatively coupled to an image capture device. Pipeline 200 may include a coarse rescaling of the left image (802), followed by a segmentation of the left image (804), calculation of a global scale factor (806), application of the global scale factor to the original left image (808), segmentation of the left image (810), and individualized rescaling of the resulting finger images (812). In some examples, the outputs of pipeline 800 are different for different kinds of main camera images. The count of images produced by the pipeline may be proportional to the number of fingers in the field of view of the main camera.

Figure 9:
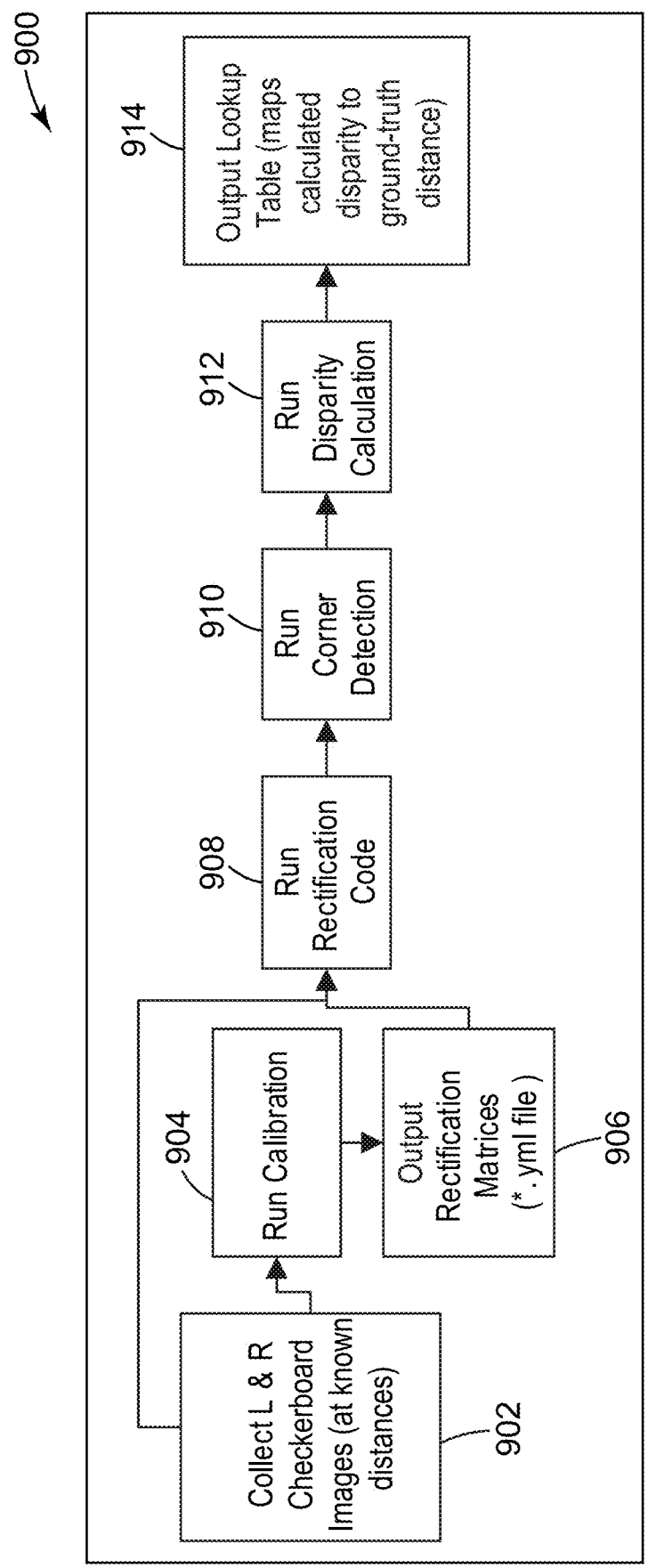
FIG. 9 illustrates operations for creating a look-up table that maps disparity to depth, in accordance with techniques of the disclosure.

FIG. 9 illustrates operations for creating a look-up table that maps disparity to depth, in accordance with techniques of the disclosure. Initially, a computing device may collect a sequence of left and right checkerboard image pairs at known distances across a travel path (902). In some examples, the travel path may be tens or hundreds of millimeters (e.g. collect a pair of images every 0.5 millimeters, as the motion controller moves the checkerboard target along the z-axis).

The computing device may use the image pairs to estimate the calibration parameters for multiple (e.g., a pair) stereo cameras (904). Calibration parameters may include intrinsic and/or extrinsic parameters. As examples, intrinsic parameters may describe a lens, and extrinsic parameters may describe the position and/or heading of the camera in world coordinates. In some examples, the computing device may generate one or more rectification matrices (906), which may include, for example, an intrinsic matrix containing parameters that describe a lens. The computing device may run rectification code based on the checkerboard images and the rectification matrices (908). In such examples, the computing device may rectify each right-camera image into the image plane of the right-camera image's respective left-camera image. As such, the rectification may be specific to each individual camera's parameters. The computing device may compute disparities for each pair of checkerboard images.

The computing device may perform corner detection by locating the corners in one or more checkerboard images (910). As an example, for each checkerboard corner point in the left image, the computing device may locate the corresponding point in the rectified right image, and compute the disparity between the points (912). The computing device may create a table that maps the disparity for a pair of images to the known depth of the images (e.g., as determined by the programmed movements of the motion controller that controls the position of the checkerboard target) (914).

Figure 10:
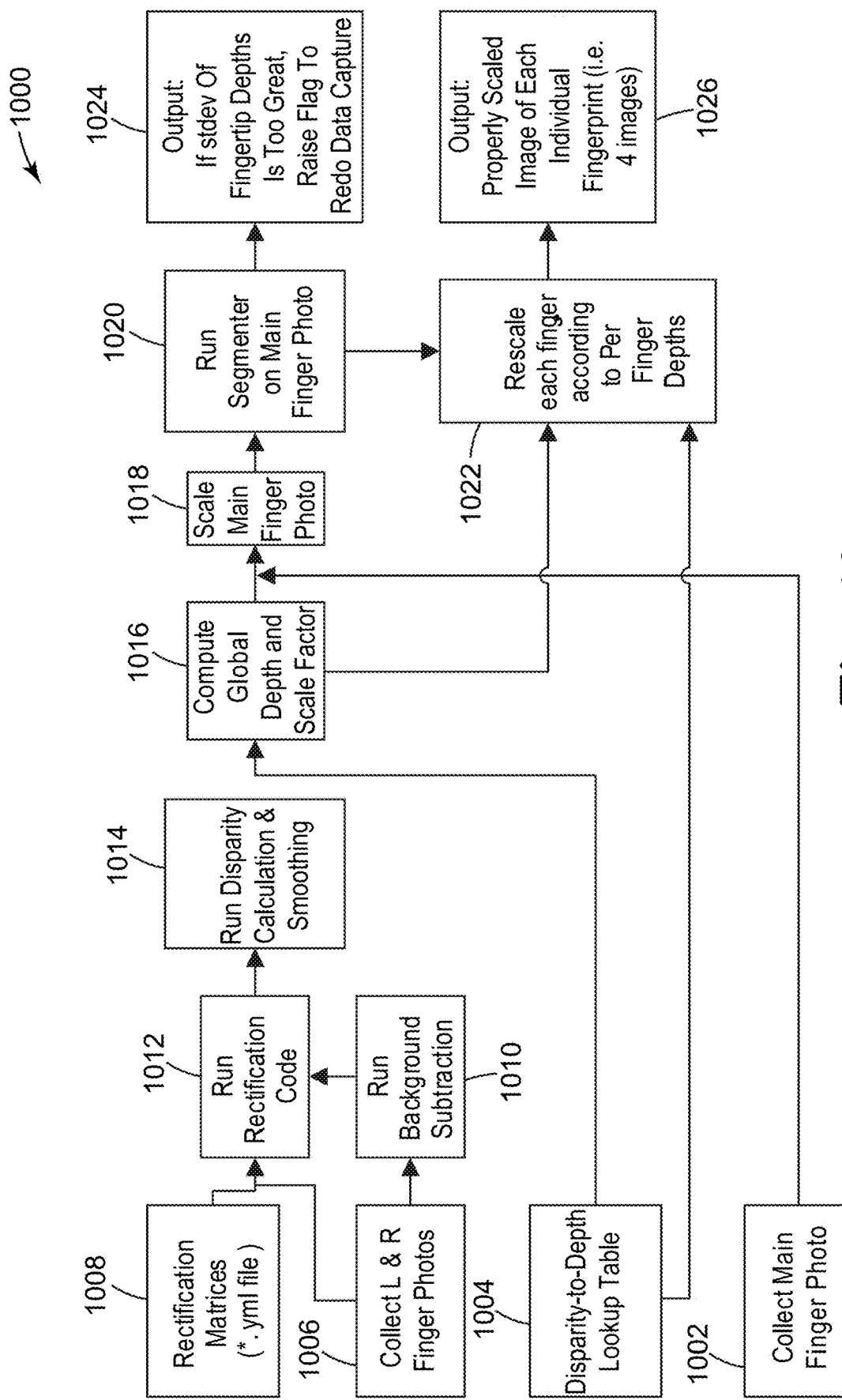
FIGS. 10-11 illustrate the use of a disparity-to-depth lookup table for image re-scaling in accordance with techniques of this disclosure.
Figure 11:
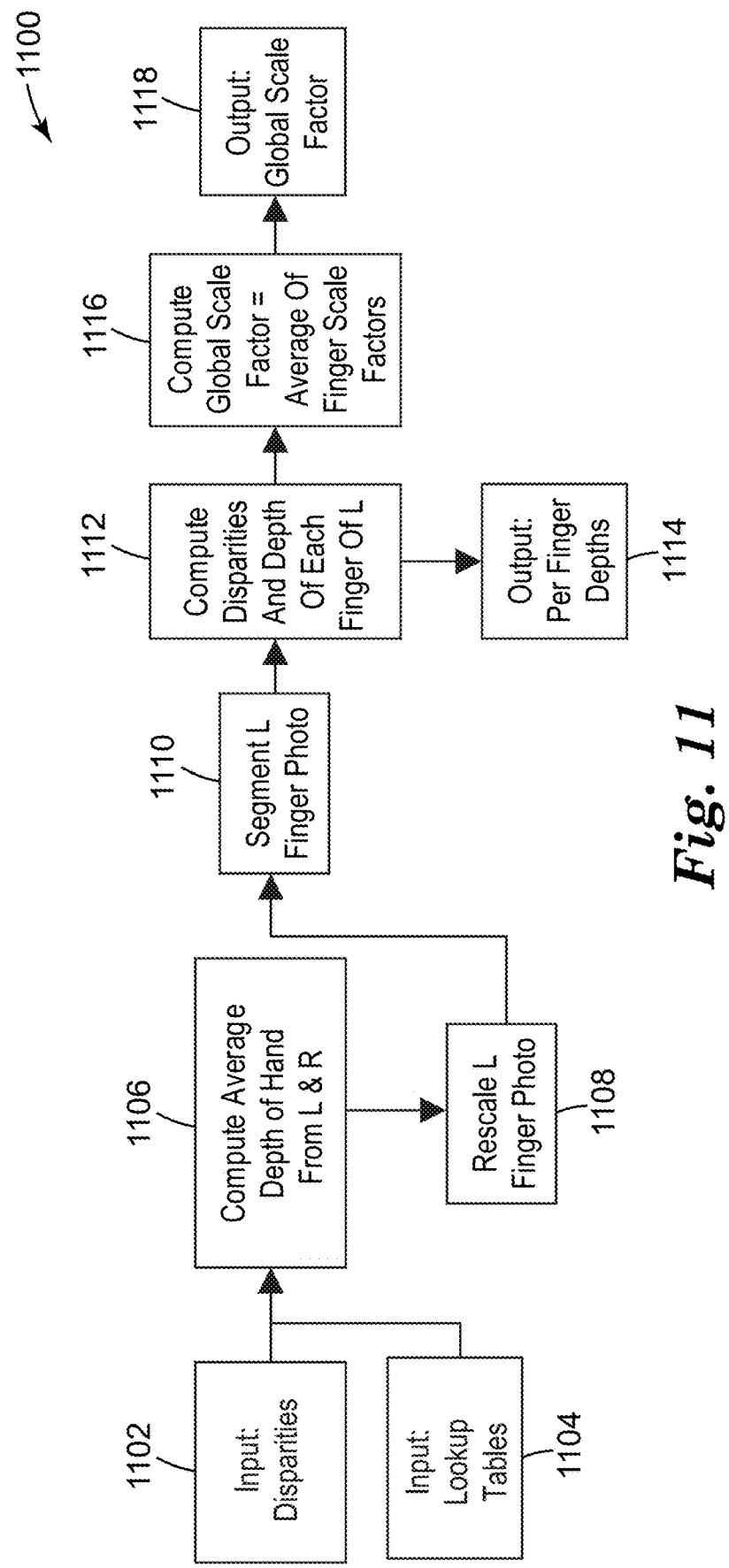

FIGS. 10-11 illustrate the use of a disparity-to-depth lookup table for image re-scaling in accordance with techniques of this disclosure. FIG. 10 illustrates an example rescaling pipeline. Inputs received or generated by a computing device for the rescaling pipeline may include a main camera image (1002), a pair of stereo camera images (1006), a lookup table produced in FIG. 9 (1004), and a set of rectification matrices (1008).

In some examples, a main camera has a central location in the layout of a noncontact fingerprint scanner. The image of a hand or object will appear to be roughly centered in the main camera image. The main camera image may be the image from which the fingerprint images and fingerprint minutiae are extracted. The stereo cameras, conversely, may be located roughly half an inch to the left and right of the main camera, and roughly an inch below the main camera, from the perspective where the device is viewed from above. The left stereo camera may capture an image of the hand from the left side of the device, which produces an image where the hand appears toward the right portion of the visual field. Conversely, the right stereo camera may capture an image of the hand from the right side of the device, which produces an image where the hand appears toward the left portion of the visual field.

A computing device may use background subtraction to remove extraneous content from the main camera image, leaving the images of the palm and fingers, with a minimum of surrounding content (1010). In some examples, stereo images are processed with the rectification matrices, and the stereo images may also undergo background subtraction (1012). The output of this rectification process in 1012 may be a rectified pair of stereo images.

The computing device may compute disparities between the rectified left and right camera images (1014). The computing device may perform disparity calculations as a part of the 3D depth calculation, and may involve searching left and right images for corresponding landmarks. A disparity may be a distance between corresponding landmarks in the left and right images. The techniques of this disclosure may apply the disparity calculation to the problem of non-contact fingerprint scanning. For each pair of stereo images, the computing device may determine multiple disparities. The computing device may exclude outlier disparity values and calculate either a mean (or median) disparity value for the left and right images as a pair (including disparities between points throughout the fingers in the two images). The computing device may determine an average disparity of the left and right image pair, along with the look-up table, to compute the mean (or median) depth of the hands in the left and right images. This disparity-to-depth lookup table maps a disparity value to a depth value.

Using the depth value for the image pair, the computing device may compute a scale factor for the two stereo cameras (1016). Calculation of this scale factor may use a depth-to-PPI lookup table, which maps a depth value to a PPI (pixels per inch) image resolution value. The depth-to-PPI lookup table may be produced similarly to the disparity-to-depth lookup table, by using a series of images of a T90 or other suitable target, rather than a checkerboard target. One or more of the lookup tables may be generated at the time of device manufacture. The computing device may compensate for differences between the heights of the stereo cameras and the main camera (e.g. by subtracting a known value which is determined at the time of manufacture or by another means), and calculate a pair of a global scale factors, which the computing device may apply to the main camera image (1018). This global scale factor is meant to rescale the main camera image in manner that is suitable for fingerprint segmentation and/or fingerprint matching. The computing device may segment the main camera image, yielding an individual image for each fingerprint (1020). Each of these fingerprint images is rescaled by the application of the fingerprint image's individualized rescale factor (1022). The individual rescale factors are computed after the left camera image is segmented and an individualized depth is computed for each fingertip in the left camera image. Alternatively, in other examples, left camera image may be projected into the image plane of the right camera image and processed to segment the right camera image. If the standard deviation of the fingertip depths is too great (e.g., greater than or equal to a threshold), then the pipeline may issue an error flag and/or require that the process be restarted using a newly captured set of images (1024). If the standard deviation of the fingertip depths is not too great (e.g., less than or equal to a threshold), then the computing device scales images of one or more fingerprints may be output or otherwise used by the computing device for authenticating a particular person.

In some examples, the computing device may use a set of data points (pairs consisting of a) disparity and b) depth) to fit a mathematical model (e.g. using the open source toolkit sklearn), and use that mathematical model (e.g. a polynomial model) to map disparity values to depth values. In some examples, the computing device may use a set of data points (pairs consisting of a) depth and b) PPI) to fit a mathematical model (e.g. using the open source toolkit sklearn), and use that mathematical model (e.g. a polynomial model) to map depth values to PPI values. As such, a computing device implementing techniques of this disclosure may generate a table, perform curve fitting on the table values to generate a polynomial model or other model, such that the model may generate intermediate output values from intermediate input values which may not be included in the table but are reproducible based on the model resulting from the curve fitting. In some examples, tables are temporarily generated for the purposes of creating one or more models, but the tables may not be retained when the computing device and/or image capture device are used in operation. That is, the models (e.g., polynomial models) generated from the tables may be used in operation to authenticate persons based on their fingerprints, but the tables may not be used for actual authentication in operation.

FIG. 11 illustrates operations (1100) that correspond to computing global depth and scaling factors, in accordance with the techniques of this disclosure. The operations of FIG. 11, may be a set of operations that comprise operation 1016 in FIG. 10. A computing device may generate and/or receive as input 1) a set of one or more disparity values (1102) and 2) a lookup table with disparity to depth values (1104) as described in FIGS. 8-10. The computing device may determine an average depth of a hand from left and right images. In some examples, in some examples, the computing device may determine an average depth value for each individual fingertip. In some examples, the computing device may rescale the left photo (1108). The computing device may segment the left photo for one or more fingers in the photo (1110). The computing device may compute disparity and depth values for each finger segmented from the left image (1112). In some examples, the computing device may output per-finger depths (1114), which may be used by the computing device for further operations described in this disclosure. In some examples, the computing device may determine a global scale factor that is equal to the average of the finger scale factors (1116). In some examples, the computing device may output a global scale factor for further operations described in this disclosure (1118).

Figure 12:
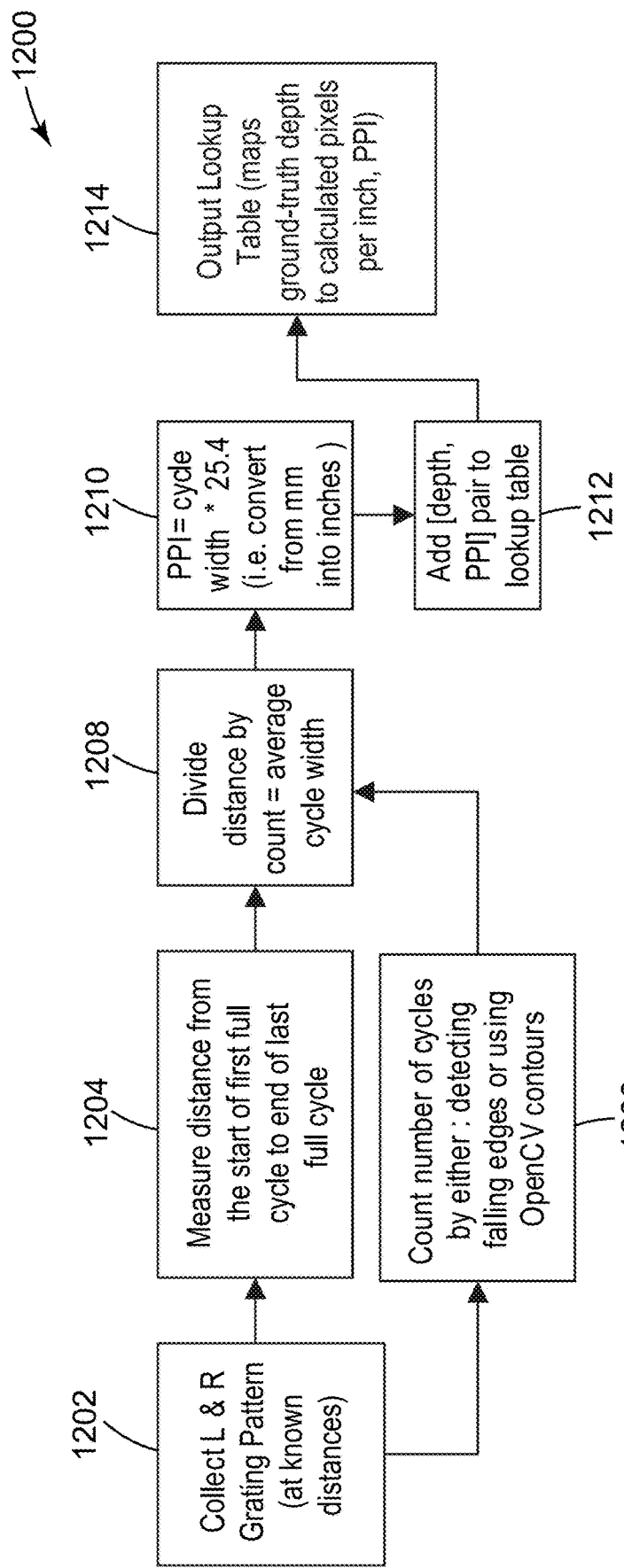
FIG. 12 illustrates operations that correspond to generating a depth-to-PPI table, in accordance with techniques of the disclosure.

FIG. 12 illustrates operations (1200) that correspond to generating a depth-to-PPI table, in accordance with techniques of the disclosure. A computing device may generate and/or receive as input one or more of a left and right grating pattern, which may be at one or more known distances (1202). The computing device may measure a distance from the start of a first full cycle to the end of a last full cycle (1204). The computing device may count a number of cycles either by detecting falling edges or using OpenCV contours (1206). In some examples, the computing device may divide the distance by the count to generate an average cycle width (1208). In some examples, the computing device may generate a PPI or resolution value based on a product of the cycle width and a constant, such as 25.4, which is used to convert from millimeters to inches (1210). In some examples, the computing device may create an association between a known depth and the resolution generated in 1210 (1212). The computing device may generate a set of depth-to-resolution associations, which may be included in a table or other data structure that maps ground-truth depths to calculated PPIs or resolutions (1214). In some examples, the computing device may perform curve-fitting to generate a model or function that may be used to generate intermediate depth-to-PPI values between those values included in the table.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor", as used may refer to any of the foregoing structure or any other structure suitable for implementation of the techniques described. In addition, in some aspects, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

It is to be recognized that depending on the example, certain acts or events of any of the methods described herein can be performed in a different sequence, may be added, merged, or left out all together (e.g., not all described acts or events are necessary for the practice of the method). Moreover, in certain examples, acts or events may be performed concurrently, e.g., through multi-threaded processing, interrupt processing, or multiple processors, rather than sequentially.

In some examples, a computer-readable storage medium includes a non-transitory medium. The term "non-transitory" indicates, in some examples, that the storage medium is not embodied in a carrier wave or a propagated signal. In certain examples, a non-transitory storage medium stores data that can, over time, change (e.g., in RAM or cache).

Various examples have been described. These and other examples are within the scope of the following claims.

What is claimed is:

1. A method comprising:
   receiving, by a computing device, an image captured by a camera or via a platen of an apparatus that includes the computing device;

determining, by a computing device, a plurality of regions of interest within the captured image;

processing, by the computing device, the captured image relative to a plane of interest that is defined by at least one of an image plane of the camera or by the platen of the apparatus that includes the computing device by:

rescaling, by the computing device, one or more of the respective regions of interest;

determining, by the computing device, for each respective region of interest of the plurality of regions of interest, a respective distance from one or more objects within the respective region of interest to the plane of interest; and processing, by the computing device, each respective region of interest independently of any other regions of interest included in the plurality of regions of interest, based on the respective distance from the one or more objects of each respective region of interest to the plane of interest.

2. The method of claim 1, wherein rescaling the one or more of the respective regions of interest comprises downscaling the one or more of the respective regions of interest to a predetermined resolution.

3. The method of claim 2, wherein downscaling the one or more of the respective regions of interest to the predetermined resolution comprises downscaling the one or more of the respective regions of interest to a resolution of one of 500 pixels per inch or 1000 pixels per inch.

4. The method of claim 1, wherein processing the respective regions of interest comprises performing perspective correction for at least one of the respective regions of interest.

5. The method of claim 1, wherein the captured image represents a friction ridge surface.

6. The method of claim 5, wherein the captured image represents a friction ridge surface associated with at least one of a palm print, a fingerprint, or a footprint.

7. A device comprising:
a memory configured to store an image an image captured by a camera or via a platen of an apparatus that includes the device; and
one or more processors in communication with the memory, the one or more processors being configured to process the image stored to the memory relative to a plane of interest that is defined by at least one of an image plane of the camera or by the platen of the apparatus that includes the computing device, wherein to process the captured image stored to the memory relative to the plane of interest, the one or more processors are configured to:
determine a plurality of regions of interest within the captured image stored to the memory;
rescale one or more of the respective regions of interest;
determine, for each respective region of interest of the plurality of regions of interest, a respective distance from one or more objects within the respective region of interest to the plane of interest; and
process each respective region of interest independently of any other regions of interest included in the plurality of regions of interest, based on the respective distance from the one or more objects of each respective region of interest to the plane of interest.

8. The device of claim 7, wherein to process the captured image relative to the plane of interest, the one or more processors are configured to rescale one or more of the respective regions of interest.

9. The device of claim 8, wherein to rescale the one or more of the respective regions of interest, the one or more processors are configured to downscale the one or more of the respective regions of interest to a predetermined resolution.

10. The device of claim 9, wherein to downscale the one or more of the respective regions of interest to the predetermined resolution, the one or more processors are configured to downscale the one or more of the respective regions of interest to a resolution of one of 500 pixels per inch or 1000 pixels per inch.

11. The device of claim 7, wherein to process the respective regions of interest, the one or more processors are configured to perform perspective correction for at least one of the respective regions of interest.

12. The device of claim 7, wherein the captured image represents a friction ridge surface.

13. The device of claim 12, wherein the captured image represents a friction ridge surface associated with at least one of a palm print, a fingerprint, or a footprint.

14. A non-transitory computer-readable storage medium encoded with instructions that, when executed, cause one or more processors of a device to:
store, to the non-transitory computer-readable storage medium, an image an image captured by a camera or via a platen of an apparatus that includes the computing device;
process the image stored to the memory relative to a plane of interest that is defined by at least one of an image plane of the camera or by the platen of the apparatus that includes the computing device, wherein the instructions that cause the one or more processors to process the captured image relative to the plane of interest comprise instructions that, when executed, cause the one or more processors to:
determine a plurality of regions of interest within the captured image stored to the
non-transitory computer-readable storage medium;
perform perspective correction for at least one of the respective regions of interest;
determine, for each respective region of interest of the plurality of regions of interest, a respective distance from one or more objects within the respective region of interest to the plane of interest; and
process each respective region of interest independently of any other regions of interest included in the plurality of regions of interest, based on the respective distance from the one or more objects of each respective region of interest to the plane of interest.

15. The non-transitory computer-readable storage medium of claim 14, wherein the instructions that cause the one or more processors to process the captured image relative to the plane of interest comprise instructions that, when executed, cause the one or more processors to rescale one or more of the respective regions of interest.

16. The non-transitory computer-readable storage medium of claim 14, wherein the instructions that cause the one or more processors to rescale the one or more of the respective regions of interest comprise instructions that, when executed, cause the one or more processors to downscale the one or more of the respective regions of interest to a predetermined resolution.

17. The non-transitory computer-readable storage medium of claim 16, wherein the instructions that cause the one or more processors to downscale the one or more of the respective regions of interest to the predetermined resolution comprise instructions that, when executed, cause the one or more processors to downscale the one or more of the respective regions of interest to a resolution of one of 500 pixels per inch or 1000 pixels per inch.

\* \* \* \* \*

UNITED STATES PATENT AND TRADEMARK OFFICE
CERTIFICATE OF CORRECTION

PATENT NO. : 11,450,140 B2
APPLICATION NO. : 17/301816
DATED : September 20, 2022
INVENTOR(S) : Robert W Shannon It is certified that error appears in the above-identified patent and that said Letters Patent is hereby corrected as shown below:

In the Claims

Column 19
Line 39, in Claim 7, after "an image", delete "an image".

Column 20
Line 25, in Claim 14, after "an image", delete "an image".

Signed and Sealed this
Eighth Day of October, 2024

Katherine Kelly Vidal
Director of the United States Patent and Trademark Office